United States Patent [19]

Boursier et al.

[11] Patent Number: 5,724,534
[45] Date of Patent: Mar. 3, 1998

[54] TRANSFERRING INSTRUCTIONS INTO DSP MEMORY INCLUDING TESTING INSTRUCTIONS TO DETERMINE IF THEY ARE TO BE PROCESSED BY AN INSTRUCTION INTERPRETER OR A FIRST KERNEL

[75] Inventors: Alain Boursier, Le Mans; Louis Giron, Mulsanne; Marie Goude, Le Mans, all of France

[73] Assignee: U.S. Philips Corporation, New York, N.Y.

[21] Appl. No.: 266,048

[22] Filed: Jun. 27, 1994

[30] Foreign Application Priority Data

Jun. 30, 1993 [FR] France .................... 93 08002

[51] Int. Cl.$^6$ .................................................. G06F 9/24
[52] U.S. Cl. ............................................ 395/385; 395/598
[58] Field of Search ................................ 395/375, 800, 395/425, 598, 385

[56] References Cited

U.S. PATENT DOCUMENTS

| | | | |
|---|---|---|---|
| 3,478,322 | 11/1969 | Evans | 395/598 |
| 3,735,363 | 5/1973 | Beers et al. | 395/595 |
| 4,166,289 | 8/1979 | Murtha et al. | 395/425 |
| 4,204,252 | 5/1980 | Hitz et al. | 395/598 |
| 4,268,903 | 5/1981 | Miki et al. | 395/375 |
| 4,926,355 | 5/1990 | Borland | 395/425 |
| 5,045,993 | 9/1991 | Murakami et al. | 395/375 |
| 5,218,710 | 6/1993 | Yamaki et al. | 395/800 |
| 5,241,679 | 8/1993 | Nakagawa et al. | 395/725 |
| 5,247,627 | 9/1993 | Murakami et al. | 395/375 |
| 5,450,553 | 9/1995 | Kitagaki et al. | 395/375 |
| 5,504,916 | 4/1996 | Murakami et al. | 395/800 |
| 5,519,879 | 5/1996 | Carmon | 395/800 |

FOREIGN PATENT DOCUMENTS

| | | |
|---|---|---|
| 0442041 | 8/1991 | European Pat. Off. . |
| 0472386 | 2/1992 | European Pat. Off. . |
| 63-296151 | 12/1988 | Japan . |
| 2294734 | 12/1990 | Japan . |
| 2208187 | 3/1989 | United Kingdom . |

OTHER PUBLICATIONS

"The Motorola DSP96002 IEEE Floating-Point Digital Signal Processor" by Kevin L. Kloker et al, ICASSP 89, vol. 4, May 23, 1989, Glasgow pp. 2480-2483.

"Enhanced Performance Single-Chip DSP Requires Minimal External Circuitry" by Daniel A. Ash, Twenty-Second Asilomar Conference on Signals, Systems and Computers, Oct. 31, 1988, pp. 885-889.

*Primary Examiner*—Richard L. Ellis
*Attorney, Agent, or Firm*—Brian J. Wieghaus

[57] ABSTRACT

A part of the read-write memory of a digital signal processor, generally referred to as a DSP, is used for the storage of a software layer which acts as a control unit which reads instructions in an, if desired large, memory external to the DSP, and which controls their transfer to the program memory of the DSP, which transfer is effected instruction by instruction or at least instruction block by instruction block. Field of use: real-time digital computations, particularly in consumer products, such as telematics terminals.

11 Claims, 2 Drawing Sheets

TRANSFERRING INSTRUCTIONS INTO DSP MEMORY INCLUDING TESTING INSTRUCTIONS TO DETERMINE IF THEY ARE TO BE PROCESSED BY AN INSTRUCTION INTERPRETER OR A FIRST KERNEL

BACKGROUND OF THE INVENTION

The invention relates to a method of operating a digital signal processor having a micro-instruction sequencer and an instruction interpreter adapted to bring about the execution of instructions stored in a program memory provided in the digital signal processor, said processor being further associated with an external memory containing instructions to be executed, software means being provided for transferring said instructions from the external memory into said program memory.

The invention also relates to a device comprising a digital signal processor having a micro-instruction sequencer and an instruction interpreter adapted to bring about the execution of instructions stored in a program memory provided in the digital signal processor, the device further comprising a memory external to the digital signal processor and containing instructions to be executed, and comprising means for transferring said instructions from the external memory into said program memory.

Such digital signal processors, which are generally referred to as "DSPs", have been in use in the industry since about 1980, primarily for real-time digital computations. They can also be used for asynchronous operation, for example in simulation and picture processing. Moreover, they are used in consumer products, for example in telematics terminals, for example for use in audio signal processing, or in modems.

A digital signal processor has art architecture dedicated to real-time digital computation. Typically a DSP is a high speed reduced instruction set device which is able of carrying out specific tasks, such as arithmetic tasks, in a much quicker way than a microprocessor, which is more powerful but much slower. Its architecture is dictated primarily by the requirement of a maximal computing speed, which is at the expense of programming facilities and, above all, storage capacity, particularly of the program memory. Therefore, it has been envisaged to use an, if desired large, external memory containing an application program, whose instructions are loaded sequentially into said program memory of the digital signal processor.

A device using such a method is known from the document EP-A0,472,386. According to said document a digital signal processor interprets the instructions from an internal program memory, whose software elements form portions of a larger application program and re read under control of a central unit, i.e. a main microprocessor with which the digital signal processor is associated, which main microprocessor stores this application program in a program library loaded into another memory than that of the digital signal processor.

SUMMARY OF THE INVENTION

It is an object of the invention to provide a more economical way of realizing a system employing a digital signal processor with a large application program, in particular by dispensing with the afore-mentioned main microprocessor for controlling the transfer of instructions from the memory containing the application program to the program memory of the digital signal processor.

This is achieved in that the whole of said software means, comprising a software layer for reading instructions in the external memory and for controlling their transfer to the program memory, is located in the program memory of the digital signal processor.

A device in accordance with the invention is characterized in that the whole of said means for transferring said instructions is situated inside the program memory of the digital signal processor, comprising a software layer adapted for reading instructions in the external memory and for controlling their transfer to the program memory.

Thus, the invention is based on the idea of using a part (approximately 30%) of the memory of the digital signal processor to accommodate a software layer playing the role of a rudimentary central unit. An additional advantage of this method is that it is also possible to gain time on the operations for the transfer of instructions from the external memory to the internal memory because a digital signal processor is generally faster than a microprocessor.

It is advantageous if said software layer includes means for transferring the current instruction in the external memory directly to the program memory when this instruction can be interpreted by the interpreter of the digital signal processor, and for directly processing a current instruction of the external memory when this instruction is a routing instruction which cannot be interpreted by the interpreter of the digital signal processor.

It is also advantageous if said software layer includes means for maintaining a stack, and means for paging control in the external memory.

Such an organisation is very flexible and readily adaptable because it only requires a modification of the software layer controlling the external instructions in order to allow the use of new types of instructions, for example of the "MACRO" type.

BRIEF DESCRIPTION OF THE DRAWINGS

These and other more detailed aspects of the invention will become apparent from the following description of a non-limitative embodiment.

DETAILED DESCRIPTION OF THE PREFERRED EMBODIMENTS

The operation of the device will be described, by way of example, with reference to a processing method for a telephony-type audio signal, which signal is converted into compressed digital samples by sampling every 125 μs. Such a data compression requires very rapid real-time computations for each sample. However, it will be obvious that the device can also be used for any other digital computation in real time or in asynchronous mode.

Figure 1:
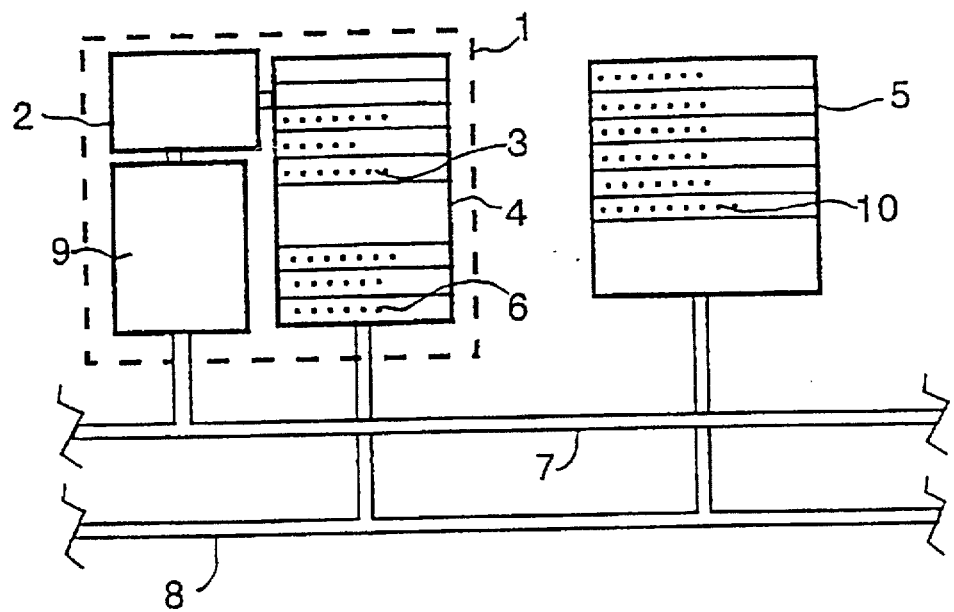
FIG. 1 shows very diagrammatically a part of a device comprising a digital signal processor associated with an external memory containing instructions to be executed.

The device whose diagram is shown in FIG. 1 comprises a digital signal processor 1 having an instruction interpreter 2 adapted to execute instructions 3 stored in a program memory 4 forming part of the digital signal processor 1, which instructions process data contained in the data memory 9, which data is received from (and, if required, subsequently returned to) a larger external memory under control of certain instructions 3. A DSP typically includes a micro-instruction sequencer, with a program pointer that allows the interpreter 2 to determine which instruction 3 it must process. This process can make use in a well known manner of an internal arithmetic-logic unit that typically comprises a high speed multiplier (not shown).

The digital signal processor comprises two memories and two different buses, i.e. memories 4 and 9 for the program and the data, respectively, and buses 8 and 7 for the program and the data, respectively. The memory 4 usually has a capacity of the order of a few thousands of instructions. The instructions, also called "codes", are represented by numbers.

The device also comprises a memory 5 which is external to the digital signal processor and which contains instructions 10 of an application program to be carried out, for example an audio data compression program.

Software means formed by a software layer 6 called "kernel", which is stored inside the program memory 4 of the digital signal processor, enable the instructions 10 to be loaded sequentially into the memory 4 in place of the instructions 3. This does pose any problems because a digital signal processor can generally address large external memories and can also control several tasks simultaneously, which enables the audio signal to be processed by means of the instructions 3 while these instructions are kept up-to-date by means of instructions 6 (i.e. a kind of self-programming). The kernel is able to process either its own instructions, or to send the process to the instructions 3, with the help of jump instructions, as it will be explained in more detail below.

The relevant instructions 6 are executed during free time intervals. During the execution of the kernel instructions 6 by means of the interpreter 2 instructions are read in the memory 5 and transferred to the program memory 4. This kernel particularly comprises instructions or "codes" enabling the control of a pointer for indicating the current instruction in the external memory. A current instruction 10 is first read and loaded into a buffer memory. Subsequently, said current instruction is analyzed (by instructions of the kernel) to determine whether it can be interpreted by the interpreter 2. If this is the case, the kernel transfers this instruction directly from the memory 5 to the program memory 4.

Conversely, if said instruction is a routing instruction (jump to a non-consecutive address in the memory 5 or conditional code involving a subsequent jump) which cannot be interpreted by the interpreter of the digital signal processor, it is interpreted (meaning, for example, that the new address has to be located in the memory 5 in response to a "go to" type instruction 10) and executed by the kernel itself until again an instruction 10 is found which can be executed by the interpreter 2. Thus, the kernel is both an editor and an interpreter for the instructions 10.

To provide the kernel with the means for thus carrying out certain instructions 10 is comprises a stack pointer for maintaining a supplementary stack. Since the size of the stack of a digital signal processor is very small the use of a supplementary stack is required specifically for controlling the transfer of the program form the memory 5 to the memory 4. A part of the data memory 9 can be used to accommodate this stack but it may also be situated in the memory 5.

The kernel also includes instructions for paging control in the external memory 5 (i.e. for loading a register with the current page number in the memory 5).

Obviously, the subroutines in the program 10 (calling, returning to the main program) are also controlled by the kernel 6: this concerns operations of the same kind as the control of conditional or unconditional jumps.

Figure 3:
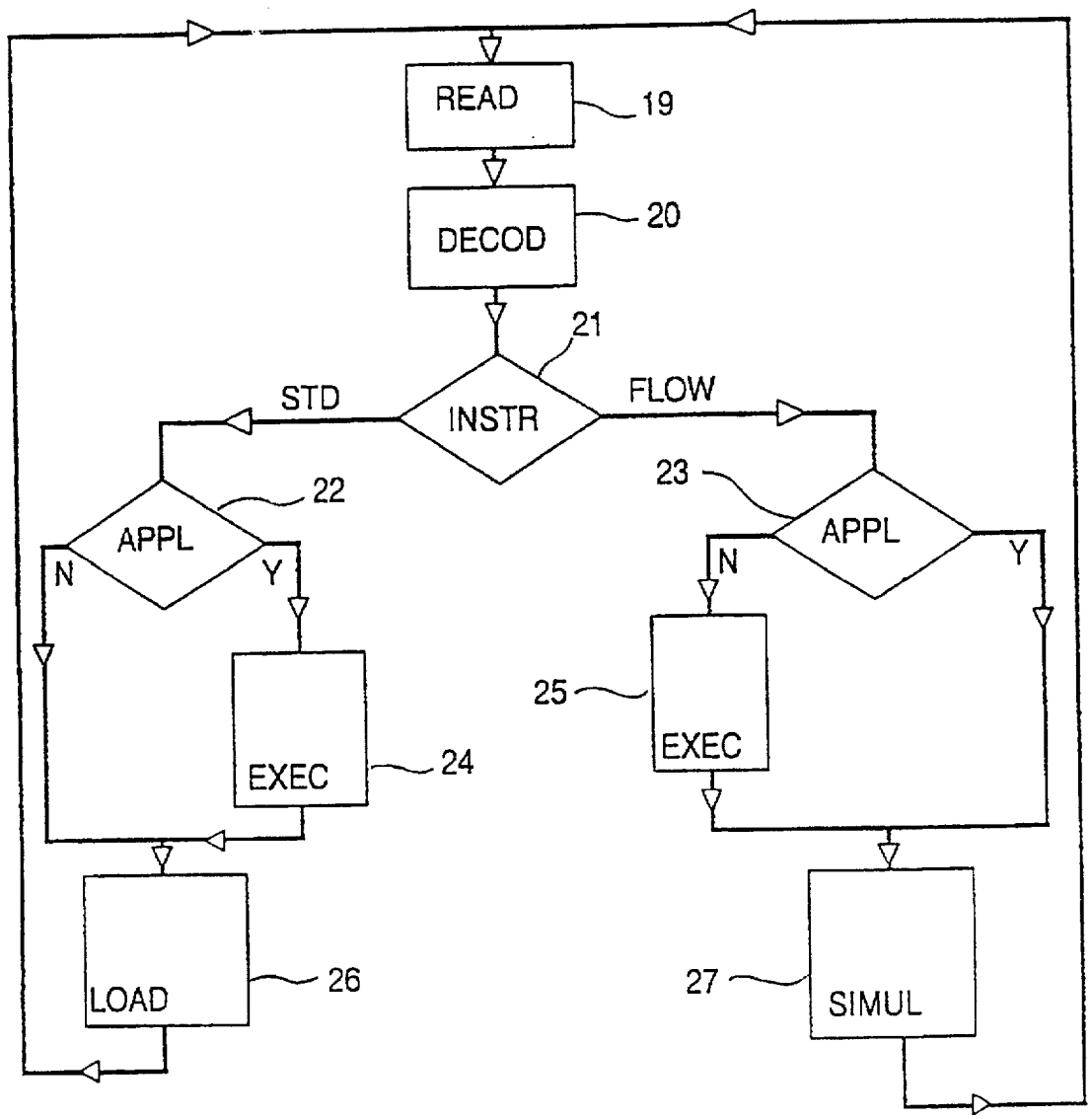
FIG. 3 is a function diagram illustrating the operation of software means which read instructions in the external memory and control their transfer to the program memory.

The operation of the kernel will be described in more detail with reference to the flow chart in FIG. 3. At a given instant the kernel reads an instruction in the external memory (5, FIG. 1), which is represented by the block 19, "READ". Subsequently, this instruction is decoded by the kernel (block 20, "DECOD"), a test being effected (lozenge 21, "INSTR") to check whether this instruction is a standard instruction ("STD") or a branch instruction ("FLOW"). This can be made on the basis of the number that represents the code, for instance in comparing this number to the content of a table containing all the numbers that define branching codes. In the first case a second test (lozenge 22, "APPL") is carried out to determine if the part of the memory 4 in FIG. 1 is reserved for the application instructions is full or not full. If it is full ("Y") all the instructions it contains are executed (block 24, "EXEC"), the instructions being unloaded from memory 4 after they have been executed, and subsequently the instruction coming from the external memory is loaded into the memory 4. For executing the instructions 3, the kernel will put, following the transferred instructions in the program memory 4, a branching instruction that gives the lead back to the kernel when the transferred instructions will have been executed, and then the program pointer of the DSP is given a value that leads to the beginning of the set of transferred instructions. These instructions are then executed and, after that, the program pointer returns again to the kernel, due to the branching instruction that has been put after the instructions. If the test 22 indicates that the memory 4 is not full, i.e. if there is still room, the instruction from the external memory is immediately loaded into the relevant space of the memory 4. After this loading operation the program proceeds with the read-out (block 19) of the next instruction in the memory 5 in FIG. 1 (increasing the pointer) and the process continues.

If after the test 21 the instruction read in the memory 5 is a branch or equivalent instruction ("FLOW") a further second test is performed (lozenge 23, "APPL") to determine if the part of the memory 4 in FIG. 1 reserved for the application instructions is empty or not. If it is empty ("Y"), which is comparatively uncommon although allowance is to be made for it, the process proceeds directly to the block 27, "SIMUL". If it is not empty ("N") the instructions which it contains are executed (block 24, "EXEC"), and a branching instruction of the DSP, following the transferred instructions in the program memory 4, will give the lead back to the kernel. After this the block 27 "SIMUL" follows, in which the instruction from the external memory is simulated, i.e. is executed directly by the kernel. The kernel comprises for this purpose some instructions in order to analyze for instance if the branching condition that has been read in the external program is satisfied or not (seeking the necessary values in the external program) and to determine the address, in the external program, where to find the continuation of the instructions to be executed. An instruction in the external program can be for instance a "GO TO" instruction referring to a non-consecutive address in the instructions 10 in FIG. 1. The simulation then consists in loading a new value of the stack pointer for the external program (memorizing the previous one for the return), and proceeding to read an instruction 10 in FIG. 1 at this new address, said read-out being effected in the block 19, "READ", where the process continuous as described above, till one instruction is again a tracking or jump or call or return instruction. If the instruction is a "SUBROUTINE" instruction the kernel stores a pointer to the next consecutive instruction on its stack, incrementing the stack pointer. After that the kernel executes the procedure used to simulate the "GO TO" instruction. If the instruction is a "RETURN FROM SUBROUTINE" instruction, the kernel decrements the stack pointer, reads the return address from the stack and executes a "GO TO" this address.

Figure 2:
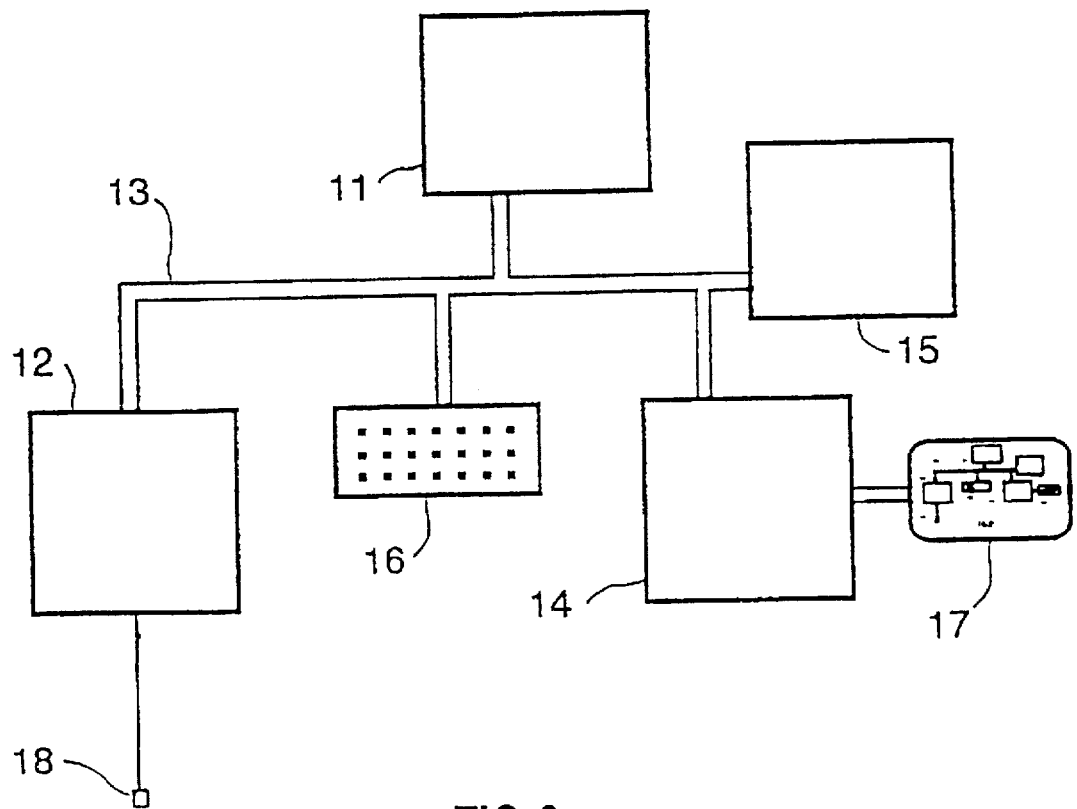
FIG. 2 shows very diagrammatically a telematics terminal comprising a display screen and a digital signal processor.

The telematics terminal shown in FIG. 2 comprises the following elements linked by a bus 13:

a modem 12 coupled to a telephone subscriber line 18, a digital signal processor 11 (DSP), a main memory 15, and a video processing unit 14, which is for example a dedicated circuit (an "Application Specific Integrated Circuit"), coupled to a display screen 17. No conventional microprocessor has been provided and for this reason the digital signal processor should control not only the signal compression operations but also the functions of the telephone terminal, which is effected by the processor by means of a program stored in the memory 15, which program is loaded into the internal memory of the processor in successive portions in the manner described hereinbefore. The bus 13 also couples said digital signal processor to the keyboard 16 of the terminal.

We claim:

1. A system, comprising:
    (a) an external memory for storing an application program having a plurality of individual instructions; and
    (b) a digital signal processor comprising
        (1) a program memory, said program memory having space allocated for a predetermined, limited number of individual instructions of said application program;
        (2) executing means for executing instructions stored in said program memory;
        (3) an instruction interpreter means for interpreting at least some of said instructions from said application program;
        (4) transfer control software stored in said program memory for controlling transfer of said instructions of said application program from said external processor to said program memory; and
        (5) means responsive to said transfer control software for transferring instructions from said external memory to said program memory under control of said transfer control software,
    said control software further determining on an instruction-by-instruction basis whether a current individual instruction in the external memory to be transferred under control of said transfer control software is a standard instruction or a branch instruction, said transfer control software further including a first kernel which interprets and executes said current instruction if it determines that said current instruction is a branch instruction so that the next individual instruction transferred from the external memory is the next instruction of the branch.

2. The system as set forth in claim 1, wherein said transfer control software comprises a sequence of codes stored in said program memory.

3. The system as set forth in claim 2, wherein said sequence of codes includes stack control instructions.

4. The system as set forth in claim 2, wherein said sequence of codes includes instructions for paging control in said external memory.

5. A system according to claim 1, wherein said transfer control software determines, in the case of a standard instruction, whether or not said space in said program memory allocated to said application program is full or not full, and if full, said execution means executes the instructions in said allocated space of the program memory, said transfer control software transferring the instructions so executed from said program memory and subsequently transferring the standard instruction from said external memory.

6. A system according to claim 5, wherein if said allocated space is not full, said transfer control software transfers the standard instruction into said allocated space without previously executing any existing instructions in the allocated space.

7. A system according to claim 1, wherein said transfer control software determines, in the case of a branch instruction, whether or not said space in said program memory allocated to said application program is empty or not, and if empty, said transfer control software executes the branch instruction.

8. A system according to claim 7, wherein if said allocated space is not empty, said execution means executes the instructions in said allocated space of the program memory, said transfer control software transferring the instructions so executed and subsequently transferring the branch instruction from said external memory.

9. A system according to claim 8, wherein said transfer control software determines on an instruction-by-instruction basis whether or not a current individual instruction transferred under control of said transfer control software can be interpreted by said instruction interpreter and including a second kernel interpreting and executing the current individual instruction when the control software determines that the current individual instruction cannot be interpreted by said instruction interpreter.

10. A system, comprising:
    (a) an external memory for storing an application program having a plurality of individual instructions; and
    (b) a digital signal processor comprising
        (1) a program memory;
        (2) executing means for executing instructions stored in said program memory; and
        (3) an instruction interpreter means for interpreting at least some of said instructions from said application program;
        (4) transfer control software stored in said program memory for controlling transfer of said instructions of said application program from said external processor to said program memory,
        (5) means responsive to said transfer control software for transferring instructions from said external memory to said program memory under control of said transfer control software,
    said control software further determining on an instruction-by-instruction basis whether or not a current individual instruction to be transferred under control of said transfer control software can be interpreted by said instruction interpreter and including a first kernel interpreting and executing the current individual instruction when the control software determines that the current individual instruction cannot be interpreted by said instruction interpreter.

11. A system, comprising:
    (a) an external memory for storing an application program having a plurality of individual instructions; and (b) a digital signal processor comprising
  (1) a program memory;
  (2) executing means for executing instructions stored in said program memory;
  (3) an instruction interpreter means for interpreting at least some of said instructions from said application program;
  (4) transfer control software stored in said program memory for controlling transfer of said instructions of said application program from said external processor to said program memory; and
  (5) means responsive to said transfer control software for transferring instructions from said external memory to said program memory under control of said transfer control software,
said control software reading on an instruction-by-instruction basis each instruction to be transferred from the external memory and testing a characteristic of said each instruction prior to transferring said each instruction from the external memory into the program memory.

* * * * *